US012327163B2

(12) United States Patent
Saeed et al.

(10) Patent No.: US 12,327,163 B2
(45) Date of Patent: Jun. 10, 2025

(54) HYBRID QUANTUM CLASSIFICATION AND DETECTION OF ANOMALIES IN APPARATUSES AND PROCESSES

(71) Applicant: MULTIVERSE COMPUTING S.L., Donostia-San Sebastián (ES)

(72) Inventors: Jahromi Saeed, Donostia-San Sebastián (ES); Sahin Serkan, Donostia-San Sebastián (ES); Orús Román, Donostia-San Sebastián (ES); Mugel Samuel, Toronto (CA)

(73) Assignee: MULTIVERSE COMPUTING S.L., Donostia-San Sebastian (ES)

( * ) Notice: Subject to any disclaimer, the term of this patent is extended or adjusted under 35 U.S.C. 154(b) by 1009 days.

(21) Appl. No.: 17/368,621

(22) Filed: Jul. 6, 2021

(65) Prior Publication Data

US 2022/0383174 A1    Dec. 1, 2022

(30) Foreign Application Priority Data

May 21, 2021 (EP) .................................. 21382467

(51) Int. Cl.
G06N 10/00 (2022.01)
G06F 16/28 (2019.01)
(Continued)

(52) U.S. Cl.
CPC ........... G06N 10/00 (2019.01); G06F 16/285 (2019.01); G06F 17/18 (2013.01); G06N 20/20 (2019.01)

(58) Field of Classification Search
CPC ....... G06F 18/214; G06F 17/18; G06N 10/00; G06N 10/20; G06N 10/40; G06N 10/60; G06N 10/70; G06N 10/80; G06N 20/20
See application file for complete search history.

(56) References Cited

U.S. PATENT DOCUMENTS 9,152,746 B2    10/2015    Troyer et al.
10,691,771 B2    6/2020    Venturelli et al.
(Continued)

FOREIGN PATENT DOCUMENTS

EP    3664099 A1    6/2020

OTHER PUBLICATIONS

Neven et al., "Training a Binary Classifier with the Quantum Adiabatic Algorithm," arXiv:0811.0416v1 [quant-ph] Nov. 4, 2008 (Year: 2008).*

(Continued)

*Primary Examiner* — Miranda M Huang
*Assistant Examiner* — Yao David Huang
(74) *Attorney, Agent, or Firm* — Snell & Wilmer LLP

(57) ABSTRACT

A method comprising: setting and training a plurality of classifiers for classification of data in two or more classes; defining a cost function with error functions; optimizing weighting factors associated with each classifier of the plurality of classifiers by converting the cost function into an Unconstrained Optimization problem and solving it with a Tensor Network; setting a boosted classifier based on the optimized weighting factors; solving a problem requiring classification of datapoints in a dataset in the two or more classes using the boosted classifier, the problem defining either a configuration or operation of an apparatus or system, or behavior of a process; and determining at least one of: whether a potential anomaly exists in the operation or the behavior; and a configuration of the apparatus or the system intended to at least one of improve the operation and solve the potential anomaly thereof.

20 Claims, 3 Drawing Sheets

(51) Int. Cl.
*G06F 17/18* (2006.01)
*G06N 20/20* (2019.01)

(56) References Cited

U.S. PATENT DOCUMENTS

| | | | |
|---|---|---|---|
| 2019/0041845 A1 | 2/2019 | Cella et al. | |
| 2020/0320422 A1* | 10/2020 | Lubensky | G06N 10/60 |
| 2021/0097446 A1* | 4/2021 | Kim | G06F 16/285 |
| 2021/0133618 A1* | 5/2021 | Cao | G06J 1/02 |

OTHER PUBLICATIONS

Neven et al., "QBoost: Large Scale Classifier Training with Adiabatic Quantum Optimization," JMLR: Workshop and Conference Proceedings 25:333-348. 2012 (Year: 2012).*
Hajiabadi et al., "On Extending Neural Networks with Loss Ensembles for Text Classification," arXiv:1711.05170v1 [cs.CL] Nov. 14, 2017 (Year: 2017).*
Daroczy et al., "Quantum Inspired Adaptive Boosting," arXiv:2102.00949v1 [quant-ph] Feb. 1, 2021 (Year: 2021).*
Vedran Dunjko et al. "Machine learning & artificial intelligence in the quantum domain", arxiv.org, Cornell University Library, 201 Olin Library Cornell University Ithaca, NY 14853, Sep. 8, 2017.
European Search Report dated Dec. 17, 2021 from EP Application No. 21382467.5.

* cited by examiner

HYBRID QUANTUM CLASSIFICATION AND DETECTION OF ANOMALIES IN APPARATUSES AND PROCESSES

CROSS-REFERENCE TO RELATED APPLICATIONS

This application claims priority to European Patent Application No. EP 21382467.5, filed May 21, 2021, the entire contents of which are hereby incorporated by reference in its entirety.

FIELD OF THE INVENTION

The present disclosure relates to computing devices. More specifically, it relates to methods, devices and systems intended to optimize apparatuses and/or processes, and/or detect anomalies in the apparatuses and/or processes by way of a classifier using quantum computing or quantum-inspired computing.

BACKGROUND OF THE INVENTION

The operation or behavior of many processes, apparatuses or systems are representable by way of equations with multiple terms and variables so as to account for the different features in the process, apparatus or system. Oftentimes it is possible to improve the efficiency of the processes, apparatuses or systems by setting a superior configuration or modifying an existing configuration by a superior one that influences the concerned operation or dynamics.

Even when the processes, apparatuses or system under supervision are not very complex, the equations associated therewith representing their operation or behavior might include tens or hundreds of variables that are interrelated in some way, hence optimization of the equations requires large processing power and the optimization may take a long period of time.

Delay in the solving of such problems severely impacts the control of processes, apparatuses and systems of different industries, and more particularly the product resulting from the processes, apparatuses and system.

The time it takes to solve many computing problems has been reduced considerably thanks to quantum computing. In this sense, for example U.S. Pat. No. 10,691,771 B2 provides a method for generating an embedding pattern used for solving an Integer Linear Programming problem using a Physical Ising Machine, EP-3664099-A1 provides a method for solving an exchange problem, whereas U.S. Pat. No. 9,152,746 B2 provides a quantum annealer simulator for solving optimization problems. EP application no. 21382149.9 discloses a computer-implemented method for solving complex optimization problems with Tensor Networks; quantum processors can also be used for speeding up the solving.

There are occasions in which the problems to be solved require the classification of data in several classes, and it is deemed necessary to have methods and devices whereby this type of problems can be solved effectively and/or in a period of time shorter than with prior art methods and devices. This, in turn, enables a faster and more reliable supervision and control of processes, apparatuses and systems.

SUMMARY OF THE INVENTION

A first aspect of the disclosure relates to a method comprising:

setting, by one or more processing devices, a plurality of classifiers (also referred to as weak classifiers in this disclosure) for classification of data in two or more classes, and each of the two or more classes having a numeric value associated therewith;

training, by one or more processing devices, the plurality of classifiers by inputting a first dataset thereto and reducing a first cost function associated with the plurality of classifiers, in which all classifiers of the plurality of classifiers classify each datapoint of the first dataset in one of the two or more classes;

defining, by one or more processing devices, a second cost function, the second cost function at least comprising a first term including an error function with the error of A relative to B and a second term including an error function with the error of C relative to D, and each term being weighted by a respective weighting factor greater than zero, where:

A is $F(\vec{x}_j) = \Sigma_i \alpha_i f_i(\vec{x}_j)$, where $\vec{x}_j$ is a j-th datapoint of the first dataset or a subset thereof, $f_i(\vec{x}_j)$ is a classification of the j-th datapoint by i-th classifier of the plurality of classifiers, and $\alpha_i$ is a weighting factor associated with the respective classifier that preferably ranges between 0 and 1 (i.e. $\alpha_i \in [0,1]$);

B is an actual class of the j-th datapoint;

C is a two-point correlation between A and $F(\vec{x}_{j'})$, where $F(\vec{x}_{j'}) = \Sigma_i \alpha_i f_i(\vec{x}_{j'})$;

D is a two-point correlation between the actual classes of the j-th and j-prime-th datapoints; and the error function of each term of the second cost function being for all datapoints of the first dataset or the subset thereof;

optimizing, by one or more processing devices, the weighting factors associated with each classifier of the plurality of classifiers by converting the second cost function into an Unconstrained Optimization, UO, problem, and solving the UO problem with a Tensor Network, TN, which as explained later on may or may not be assisted by at least one quantum processor or computer; and setting, by one or more processing devices, a classifier based on both the plurality of classifiers and the optimized weighting factors, thereby yielding a boosted classifier.

The one or more processing devices, which comprise one or more classical and/or quantum processors, carry out the method for generating, out of a plurality of weak classifiers, a boosted classifier. The boosted classifier has the capacity of classifying datapoints of datasets into the two or more classes with less error, on average, than the weak classifiers, thereby having a superior classification capacity.

Such superior classification capacity enables a more reliable detection of sub-optimal configurations, operation, or behavior of apparatuses, systems and processes, and likewise enables a more reliable detection of potential anomalies in the operation or behavior of the same. This, in turn, makes possible to react more frequently and more rapidly in these situations, and do so with a more precise solution, be it by commanding or actuating an apparatus and/or system to operate differently, by stopping it/them altogether, etc. Or additionally or alternatively it makes possible to provide information to an operator about the scenario in which the apparatuses, systems and/or processes are in so that the operator has a better view of a potential problem or suboptimal operation before making a decision to address the situation.

As aforesaid, the boosted classifier uses the plurality of classifiers weighted so as to provide a superior classification than that provided by the plurality of classifiers themselves. To this end, the plurality of classifiers are first trained with the first dataset. Each classifier classifies each datapoint in the dataset in one of the classes. The first dataset preferably relates as much as possible to the problem to be solved, so, by way of example, if the problem relates to the operation of several devices in a factory, the first dataset preferably includes measurements and/or data outputted by one or more alike devices. The classifiers are trained in such a way that a cost function associated with the classification of the datapoints is reduced as much as possible.

The datapoints of the datasets, including that in the problem to be solved, preferably include an N-dimensional vector with each component in the vector quantifying, by way of a real number, a feature from a set of N features. In such cases, each dataset has a size of N times the length of the respective dataset.

Even though the datapoints are to be classified in classes that are usually labels or bins, each class has a numeric value associated therewith so that error functions can be computed and optimized like. By way of example, the numeric values in an embodiment where there are two classes could be a binary variable $y_j = \pm 1$; as it is known in the art, different numeric values can be set, also based on the number of classes.

The one or more processing devices optimize the weighting factors (for the boosted classifier) associated with each classifier of the plurality of classifiers by optimization of the second cost function. The optimization is conducted by converting the second cost function into the UO problem, and solving said problem with a Tensor Network with coefficients of the tensors being modified one or more times to attain reduction in the result as known, from instance, from EP application no. 21382149.9, which is incorporated by reference in its entirety herein.

The second cost function is a hierarchical cost function that can further improve accuracy of classifiers. This is so because a hierarchical cost function is tailored to, first, allow the training of a classifier so as to minimize coarse correlation terms, and then allow the training of the classifier to minimize finer terms.

By way of example, the second cost function might be as follows:

$$C = \lambda_1 \sum_j \Delta_1(A, B) + \lambda_2 \sum_j \sum_{j'} \Delta_2(C, D)$$

Where $\lambda_1$ and $\lambda_2$ are respective weighting factors of the terms, and $\Delta_1$ and $\Delta_2$ are respective error functions of the terms. In other examples, additional terms (e.g. third, fourth, fifth, etc.) are also comprised in the second cost function, each term being additional errors of n-point (e.g. three-point, four-point, five-point, etc.) correlation between classes that the datapoints have been classified in and the actual classes. For instance, in some embodiments, the second cost function further comprises a third term including an error function (e.g. $\Delta_3$) with the error of E relative to F, where:

E is a three-point correlation between A, $F(\vec{x}_{j'})$ and $F(\vec{x}_{j''})$; and F is a three-point correlation between the actual classes of the j-th, j-prime-th, and j-second-prime-th datapoints.

With additional terms the boosted classifier set can attain an even superior classification. For instance, including normalization factors in the cost function can improve the performance of the classifier.

After optimizing the coefficients, the boosted classifier is set so that problems may be solved with it. The boosted classifier may be defined, for example and without limitation, by the formula $\mathcal{F}(\vec{x}_j) \equiv \text{sign } F(\vec{x}_j)$.

With reference to the above exemplary formula, in some embodiments:

the first term, which is multiplied by $\lambda_1$, is $\Sigma_j(y_j - F(\vec{x}_j))^2$ or $\Sigma_j \exp(-y_j F(\vec{x}_j))$ (where "exp" denotes the exponential function); and the second term, which is multiplied by $\lambda_2$, is $\Sigma_{j,j'}(y_j y_{j'} - F(\vec{x}_j) F(\vec{x}_{j'}))^2$ or $\Sigma_{j,j'} \exp(-y_j y_{j'} F(\vec{x}_j) F(\vec{x}_{j'}))$;

where $y_j$ and $y_{j'}$ are the numeric value of the actual classes of the j-th and j-prime-th datapoints, respectively.

The problem can then be subsequently solved with the boosted classifier so as to infer whether anomalies may exist in the operation or behavior of the apparatus, system or process, and/or how any configuration could be modified to improve the overall performance, e.g. make the apparatus, system or process one or more of: safer, more reliable, more cost-effective, faster, etc.

In the context of the present disclosure, the term "boosted" is used to denote that the classifier relies on the weak classifiers with optimized weighting factors and, thus, distinguish said "boosted classifier" from the weak classifiers, namely the plurality of classifiers. Different boosted classifiers are known in the art, for example AdaBoost and QBoost. It will be noted that the "boosted classifier" may as well be named "aggregate classifier" or simply "classifier". Further, the term "optimize" and its derivations—such as "optimization", etc.—should not be understood as performing the maximal improvement possible, but an improvement over a non-optimized or less optimized coefficient, problem, solution to the problem, etc.

In some embodiments, the method further comprises:

solving, by the one or more processing devices setting the boosted classifier, a problem requiring classification of datapoints in a dataset in the two or more classes using the boosted classifier, the problem defining either a configuration or operation of an apparatus or system, or behavior of a process; and determining, by one or more processing devices, at least one of the following based on the solution to the problem:

whether a potential anomaly exists in the operation of the apparatus or the system, or in the behavior of the process; and a configuration of the apparatus or the system intended to improve the operation and/or solve the potential anomaly thereof, or a configuration of any apparatus or system in the process intended to improve the behavior and/or solve the potential anomaly thereof.

The anomalies detected in the data can be related to a plurality of situations depending on the meaning of the data, such as detection of anomalies in the performance of machines in a production line, ranking of images in scanning recognition and security systems, detecting fraud in bank transactions, detecting fake news, detecting trends in the market, scoring, and more.

In some embodiments, the step of setting the boosted classifier further comprises computing a probability for each of the two or more classes.

The formulation of the probabilities depends upon the number of classes that the data can be classified in. For example, in embodiments in which the two or more classes include two classes only, the probabilities are:

$$\mathcal{P}\left(\vec{x}_j \in \text{class}_{n=1}\right) = \frac{1+F\left(\vec{x}_j\right)}{2} \text{ and } \mathcal{P}\left(\vec{x}_j \in \text{class}_{n=2}\right) = \frac{1-F\left(\vec{x}_j\right)}{2}.$$

In embodiments in the two or more classes include three or more classes, other formulations are possible, including the formulation of concatenation of two-classes probabilities as it is known in the art.

The probabilities can be used in the determining step so as to establish the potential anomaly or improved configuration. In this sense, the determination can be made when one or more of the computed probabilities exceeds or does not exceed at least one predetermined threshold. Additionally or alternatively, the computed probabilities can be outputted by means of user presenting means (e.g. a screen, loudspeakers, etc.) so that a person can be informed of the outcome of the classification and decide the course of action in what regards the operation of the apparatus, or system, or the evolution of the process, with the information about the probabilities, which may reveal the existence of potential anomalies or subpar configurations.

In some embodiments, the method further comprises:
storing, by the one or more processing devices setting the boosted classifier, the boosted classifier (and, preferably, the probabilities in those embodiments in which they are computed) associated with the weighting factors of the terms of the second cost function;
modifying, by the one or more processing devices defining the second cost function, the second cost function by at least reducing the weighting factor of the second term without becoming less than zero;
optimizing, by the one or more processing devices optimizing the weighting factors, the weighting factors associated with each classifier of the plurality of classifiers by optimizing the modified second cost function;
setting, by the one or more processing devices setting the boosted classifier, the boosted classifier (and, preferably, the probabilities for each of the two or more classes in those embodiments in which they are computed) based on the optimized weighting factors of the modified second cost function;
storing, by the one or more processing devices setting the boosted classifier, the boosted classifier (and, preferably, the probabilities) associated with the weighting factors of the terms of the modified second cost function;
repeating the steps of modifying the second cost function, optimizing the weighting factors by optimizing the modified second cost function, and both setting and storing the boosted classifier (and, preferably, the probabilities) based on the optimized weighting factors of the modified second cost function at least once; and
selecting, by the one or more processing devices setting the boosted classifier, the boosted classifier (or the pair of boosted classifier and probabilities, if computed) among all the stored boosted classifiers (or stored pairs of boosted classifiers and probabilities) that attains a best result in an accuracy test.

The repetition of different optimization runs and storage of the results thereof makes possible to further improve the boosted classifier owing to the computation of other weighting factors associated with the plurality of classifiers. In each optimization run, at least the weighting factor of the second term is reduced so as to find other weighting factors associated with the plurality of classifiers and which might produce better results. The results are stored in at least one memory or a server communicatively coupled with the processing device(s) conducting the optimization.

The accuracy test may be any known in the art, for example but without limitation, f1-score, AUC, false positives, false negatives, etc.

Additionally, in those embodiments in which the second cost function comprises additional terms (e.g. a third term, a fourth term, etc.), the aforesaid process is carried out such that in first iterations the weighting factor of the last term (e.g. third term) is reduced, then in further iterations the weighting factor of the preceding term (e.g. second term) is reduced, and so on so as to iterate the modification of all the weighting factors aside from that of the first term. The weighting factor of the first term may be modified as well if deemed convenient but does not affect the optimization in the same way as the other weighting factors since, in essence, it plays the role of a global normalization.

In some embodiments, in the step of optimizing the weighting factors by optimizing the modified second cost function starts with weighting factors as optimized in the previous repetition of optimizing the weighting factors.

The initial guess for modified second cost function comprises the previously optimized weighting factors so that the current optimization run starts from some optimized values.

In some embodiments, the step of repeating is carried out such that at the last repetition the weighting factor of the second term of the second cost function is less than one. In some of these embodiments, the weighting factor of the second term at the last repetition is zero.

The weight of the second term, corresponding to the difference of the two-point correlations, is reduced progressively until it reaches a value below one or even becomes zero so that the first term prevails in the second cost function. In this manner, the second cost function is a hierarchical cost function.

Additionally, in those embodiments in which the second cost function comprises additional terms (e.g. a third term, a fourth term, etc.), the repetition is carried out such that in some repetitions the weighting factor of a term of the second cost function that is being modified is less than one, or is even zero.

In some embodiments, in the step of defining the second cost function the weighting factor of the second term is at least ten times greater than the weighting factor of the first term.

It is preferable to initially fulfill the following relationship $\lambda_2 \gg \lambda_1$ so that there is more room for reducing the finer terms (of a hierarchical cost function as explained above). Such relationship is fulfilled when the weighting factor of the second term, $\lambda_2$, is at least one order of magnitude greater than the weighting factor of the first term, $\lambda_1$; the weighting factor of the first term may even be the unit. In order to enhance the classification capacity of the boosted classifiers, depending upon to be processed it may be convenient to have a larger difference between the two weighing factors so that more varied configurations are tested, for instance two orders of magnitude greater.

In some embodiments, the step of optimizing the weighting factors comprises:

converting the second cost function into an Unconstrained Optimization, UO, problem;

providing a Tensor Network, TN, with tensors such that the TN covers all possible configurations of variables of the UO problem, the variables being discretized weighting factors ($\alpha_i$) associated with the respective classifiers;

providing a set of parameters and modifying coefficients of each tensor of the TN at least once for the provided set of parameters and such that, when modifying the coefficients of any tensor, a value of the cost function of the UO problem is reduced, the set of parameters relating to at least one parameter modifying the TN and/or at least one parameter that influences the modification of coefficients;

repeating the modifying step for the provided set of parameters until first one or more predetermined criteria are met, the first one or more predetermined criteria relating to the value of the cost function of the UO problem and/or a number of times that the modifying step has been conducted for the provided set of parameters;

storing at least the value of the cost function associated with the provided set of parameters every time the first one or more predetermined criteria are met;

repeating the providing the set of parameters and modifying steps one or more times, each time providing a different set of parameters so as to allow further reduction in the value of the cost function;

when the coefficients of the tensors have been modified for at least two provided sets of parameters and every time the first one or more predetermined criteria are met, checking whether the value of the cost function last stored meets a second predetermined criterion, the second predetermined criterion relating to a convergence reached in the value of the cost function based on one or more other values of the cost function stored;

every time the second predetermined has not been met in the checking step:
repeating the providing the set of parameters and modifying steps with a different set of parameters thereby allowing further reduction in the value of the cost function, the different set of parameters relating to at least one parameter modifying the TN and/or at least one parameter that influences the modification of coefficients; and/or
changing the first one or more predetermined criteria and repeating the modifying step for the provided set of parameters; and when the second predetermined criterion has been met in the checking step, solving the UO problem using the TN and providing respective values of the weighting factors.

The Tensor Network solves the UO problem featuring the cost function to be optimized. The one or more classical and/or quantum processes carrying out the method processes the second cost function to provide the TN that will be used in an iterative process intended to optimize the value of the cost function. All possible configurations of the discrete variables (resulting from the discretization of the weighting factors $\alpha_i$) are present in the TN provided since it is not known in advance which configuration provides a better result than another, or which configuration optimizes the most. The discretization of the weighting factors can be as follows:

$$\alpha_i = \Sigma_{q=1}^{n} x_{\{i,q\}} 2^{-q} \text{ with } x_{\{i,q\}} = 0 \text{ or } 1, \text{ which is the bit } q \text{ for } \alpha_i$$

As it is known in the art, the tensors of a TN are interconnected by ancillary indices that take into account the structure and number of correlations in the configurational state.

The second cost function defines the UO problem. When all the discrete variables are binary, the UO problem is an Unconstrained Binary Optimization—i.e. UBO—problem, and when the discrete variables are multilevel, i.e. the variables can take more than two different values, the UO problem is an Unconstrained General Optimization—i.e. UGO—problem.

The processing device(s) forces the reduction in the value of the cost function of the UO problem by first providing a set of parameters relating to the TN and/or relating to parameters that influence tensor coefficients' modifications. With the provided set of parameters, the processing device(s) takes each tensor and modifies the coefficients thereof reducing the value of the cost function, thus it does not leave any tensor of the TN with coefficients unmodified. The modification of coefficients takes place until all tensors have been updated in this manner at least once, and whilst the first one or more predetermined criteria are not met for the provided set of parameters; these one or more predetermined criteria can be whether a predetermined number of iterations of coefficients' modification have been conducted, and/or whether one or more parameters related to the value of the cost function have attained a predetermined level of convergence. By way of example, said one or more parameters can be the value itself, its derivatives, and analytic functions of the value and its derivatives. That is to say, in some embodiments, a criterion or criteria can be whether one or more parameters related to the tensor network have attained a predetermined level of convergence. By way of example, said one or more parameters can be the singular values of specific tensor bipartitions, their derivatives, and analytic functions of such singular values and their derivatives.

The processing device(s) repeats the aforesaid process one or more times but each time with a different set of parameters so that the value of the cost function can be further reduced. The resulting value of the cost function for each of set of parameters is stored when the first one or more predetermined criteria are met, in this way the processor(s) will assess whether sufficient optimization has been achieved in the UO problem. In this sense, when at least two values have been stored, the processing device(s) takes the last stored value and checks whether it meets a second predetermined criterion which is indicative of the degree of convergence attained by the solution to the UO problem so far, i.e. whether the value of the cost function has converged to a sufficient extent according to a predetermined threshold or set of thresholds. Based on this assessment, the coefficients of the tensors are to be modified once again or, alternatively, it is deemed that said solution optimizes the cost function sufficiently. Regarding the former, before iterating over some or all tensors once again, the processing device(s) first provides another set of parameters, and/or changes the first one or more predetermined criteria; with said provision and/or change, the processing device(s) attempts to arrive at a better solution when modifying the coefficients of the tensors.

Parameters of the TN that can be part of the set of parameters are, for example but without limitation: a bond dimension of the TN, a unit cell of the TN, etc.; parameters that configure the modification of the coefficients that can be part of the set of parameters are, for example but without limitation: a Trotter-step in imaginary-time evolution, an error tolerance in algebra functions used for modifying the coefficients, a number of times that each tensor must have its coefficients modified, etc. Likewise, the first one or more predetermined criteria can be modified so as to change the predetermined number of iterations of coefficients' modification, the predetermined level of convergence of the one or more parameters, etc. A combination of any one of these parameters or criteria is possible to further reduce the value of the cost function.

When the first and second predetermined criteria are met, the processing device(s) determines that the solution optimizes the problem to a certain degree, that is to say, that the values of the weighting factors associated with the plurality of classifiers at least attain some optimization. A trade-off between execution or running time of the process and the level of optimization can be configured.

In some embodiments, the method further comprises benchmarking the trained plurality of classifiers by inputting a second dataset thereto for classification of each datapoint of the second dataset in one of the two or more classes by all of the plurality of classifiers, the second dataset not including datapoints from the first dataset.

A benchmarking step for validating the training of the classifiers follows the training, in which case the second dataset includes unseen datapoints so as to avoid bias in the result of the benchmarking process. The benchmarking determines how good the classifiers are trained by means of the first cost function, which is evaluated for the second dataset.

In some embodiments, the steps of training the plurality of classifiers and benchmarking the trained plurality of classifiers are repeated with each of the first and second datasets including different datapoints than those used in previous iterations of the steps, the repetition being carried out until the benchmarking step determines that the plurality of classifiers is trained such that a result of the first cost function is less than a predetermined threshold.

Forcing the retraining of the plurality of classifiers may be preferred to start the setting of the boosted classifier with weak classifiers attaining a better classification.

In some embodiments, the step of modifying the coefficients comprises providing the tensor to at least one quantum processor and/or to at least one classical processor, and receiving the tensor with modified coefficients from the at least one quantum processor and/or the at least one classical processor, the at least one quantum processor using quantum linear algebra and the at least one classical processor using classical linear algebra.

The coefficients can be modified by means of quantum processor(s) and/or classical processor(s), each using respective linear algebra functions for effecting the modification of coefficients.

Classical processors, i.e. processors that are non-quantum, can take the form a central processing unit (CPU), a graphics processing unit (GPU), a field-programmable gate array (FPGA), or a combination thereof. When a plurality of classical processors is used, they can be configured to perform distributed processing, and preferably are arranged so as to form a high-performance computing network or cluster for processing the tensors more rapidly. The classical processor(s) runs classical linear algebra functions such as one or more of: singular value decomposition (SVD), exact diagonalization (ED), principal component analysis (PCA), matrix multiplication (MM), etc.

Quantum processors, or QPUs, can take the form of superconducting circuits, photonic circuits, ion-trap circuits, neutral atom circuits, etc. When a plurality of such processors is used, they likewise might be arranged as forming a cluster of QPUs for distributing the solving of a computing task between several processors of this type so that they compute threads thereof in parallel. Typically, QPUs are capable of conducting linear algebra operations, in this case quantum linear algebra operations, faster than classical processors, and even more so when large objects are being evaluated. In fact, classical processors usually struggle significantly with these operations whenever a computing problem has to be solved. QPU(s) runs quantum linear algebra functions such as one or more of: quantum SVD, quantum ED, quantum PCA, quantum MM, etc.

In some embodiments, the plurality of classifiers comprises, for example, one of: support vector machine, tensor network support vector machine, and decision tree; said plurality of classifiers being set in one or more classical processors of the one or more processing devices.

Support vector machine works by finding the optimal hypersurface separating the different classes of data, as described in machine learning literature. Tensor network support vector machines work by decomposing the weight vector $W^l$ using a tensor network, from the formula:

$$f^l(x)=W^l\cdot\phi(x)$$

where $W^l$ is the aforementioned weight vector, l is the class label, $\phi$ is the feature map, x is the data vector, and $f^l(x)$ is the decision function for the classification, as specified in the literature for tensor network machine learning such as [Advances in Neural Information Processing Systems 29, 4799 (2016)]. Decision trees work by splitting features in the data into subsequent subsets forming a tree-like structure and allowing classification, as specified in standard machine learning literature.

In some embodiments, the plurality of classifiers comprises one of: quantum support vector machine, quantum neural network, etc.; said plurality of classifiers being set in one or more quantum processors of the one or more processing devices.

Quantum support vector machines work, for example, by either finding the optimal hypersurface to separate data classes by using a quantum annealer as specified explicitly in [Comput. Phys. Commun. 248, 107006 (2020)], or by using an HHL quantum matrix inversion algorithm to accelerate performance as specified explicitly in [Phys. Rev. Lett. 113, 130503 (2014)]. Quantum neural networks work for example by optimizing the parameters of a variational quantum circuit in a similar way as the optimization by backpropagation of the parameters of a neural network, possibly using data reuploading, as specified explicitly in [Quantum 4, 226 (2020)].

In some embodiments, the UO problem solved with the TN includes one or more terms for normalization of the weighting factors associated with each classifier of the plurality of classifiers.

The terms for normalization are includes an extra penalty term via a Lagrange multiplier that can be, for example but without limitation, $|\Sigma_i \alpha_i|$ or $(\Sigma_i \alpha_i - 1)^2$ to name a few examples. In this manner, the optimization becomes simpler.

In some embodiments, the method further comprises, based on the determination made, providing, by one or more processing devices, at least one command to or actuating the apparatus, the system, or the apparatus or the system intervening in the process for configuration thereof, the at least one command or actuation being intended to improve a respective operation or behavior, and/or to solve a respective potential anomaly.

Commands for actuation can be derived from the solution, i.e. the determination made, so as to automatically adjust the operation or behavior of the concerned entity or process and, thus, make it more efficient, reliable, cost-effective, safer, etc.

In some embodiments, one or more datapoints (and/or one or more values thereof) in the dataset of the problem to be solved using the boosted classifier relate to one or more devices of the apparatus, the system, or the apparatus or the system intervening in the process, and the at least one command is provided to or the actuation is made on one of the following: at least one device of said one or more devices, at least one device different from said one or more devices, and a combination thereof.

In some embodiments, the problem solved using the boosted classifier relates to a problem of one of: control of a factory, control of a production line, control of a machine, training of a machine learning algorithm, detection of fake news, and identification of fraud.

A second aspect of the disclosure relates to a data processing device—or data processing system—comprising means for carrying out the steps of a method according to the first aspect of the disclosure.

A third aspect of the disclosure relates to a device comprising: at least one processor, and at least one memory comprising computer program code for one or more programs; the at least one processor, the at least one memory, and the computer program code configured to cause the device to at least carry out the steps of a method according to the first aspect of the disclosure.

In some embodiments, the at least one processor, the at least one memory, and the computer program code may also be configured to cause the device to carry out the steps of the different embodiments of the method described in the first aspect of the disclosure.

In some embodiments, the at least one processor comprises one or more classical processors and/or one or more quantum processors.

A fourth aspect of the disclosure relates to a computer program product comprising instructions which, when the program is executed by a computer, cause the computer to carry out the steps of a method according to the first aspect of the disclosure.

A fifth aspect of the disclosure relates to a non-transitory computer-readable medium encoded with instructions that, when executed by at least one processor or hardware, perform or make a device to perform the steps of a method according to the first aspect of the disclosure.

A sixth aspect of the disclosure relates to a computer-readable data carrier having stored thereon a computer program product according to the fourth aspect of the disclosure.

A seventh aspect of the disclosure relates to a data carrier signal carrying a computer program product according to the fourth aspect of the disclosure.

Similar advantages as those described with respect to the first aspect disclosure may also apply to the remaining aspects of the disclosure.

BRIEF DESCRIPTION OF THE DRAWINGS

To complete the description and in order to provide for a better understanding of the disclosure, a set of drawings is provided. Said drawings form an integral part of the description and illustrate embodiments, which should not be interpreted as restricting the scope of the disclosure, but just as examples of how the disclosed methods or entities can be carried out. The drawings comprise the following figures.

DETAILED DESCRIPTION OF THE INVENTION

Figure 1:
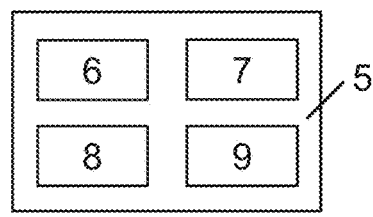
FIG. 1 diagrammatically shows a processing device in accordance with embodiments FIG. 2 diagrammatically shows a processing system in accordance with embodiments.

FIG. 1 diagrammatically shows a processing device 5 in accordance with embodiments.

Figure 2:
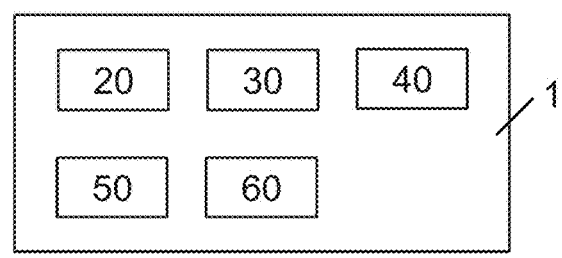

The processing device 5 can be part of a processing system, such as processing system 1 shown in FIG. 2 for instance. Methods according to the present disclosure can be carried out by the processing device 5 or by a processing system including one or more processing devices 5.

The processing device 5 comprises one or more classical processors 6 and/or one or more quantum processors 7. The processing device 5 also comprises at least one memory 7 that may include instructions, for example in the form of a computer program code, so that a method according to the present disclosure is carried out upon execution by the one or more classical processors 6 and/or by one or more classical processors (also part of the processing device 5) controlling and operating the one or more quantum processors 7.

The processing device 5 also comprises a communications module 9 at least in the embodiments in which it is communicatively coupled with other processing devices, and/or with apparatuses, systems or controlling devices operating the same or a process. The communications module 9 can be any known in the art for wired or wireless data communications.

FIG. 2 diagrammatically shows a processing system 1 in accordance with embodiments.

Processing systems 1 include one or more processing devices 5 communicatively coupled and one or more steps, or at least parts thereof, of a method are executed by one or more processing devices 5, and other parts or other one or more other steps of the method are executed by one or more other processing devices 5.

Each processing device 5 comprises one module 20, 30, 40, 50, 60 for performing certain tasks for operation of the processing system 1. In some examples, a processing device 5 is provided with a plurality of modules or all modules (as in FIG. 1). Likewise, in some examples, several processing devices 5 include a same module and may be configured to perform distributed computing between them, thereby computing the associated tasks in parallel.

Each module 20, 30, 40, 50, 60 can be part of or include tasks run (including in distributed manner) by one or more classical processors and/or one or more quantum processors.

These modules 20, 30, 40, 50, 60 will be described in more detail below with reference to FIG. 3.

Figure 3:
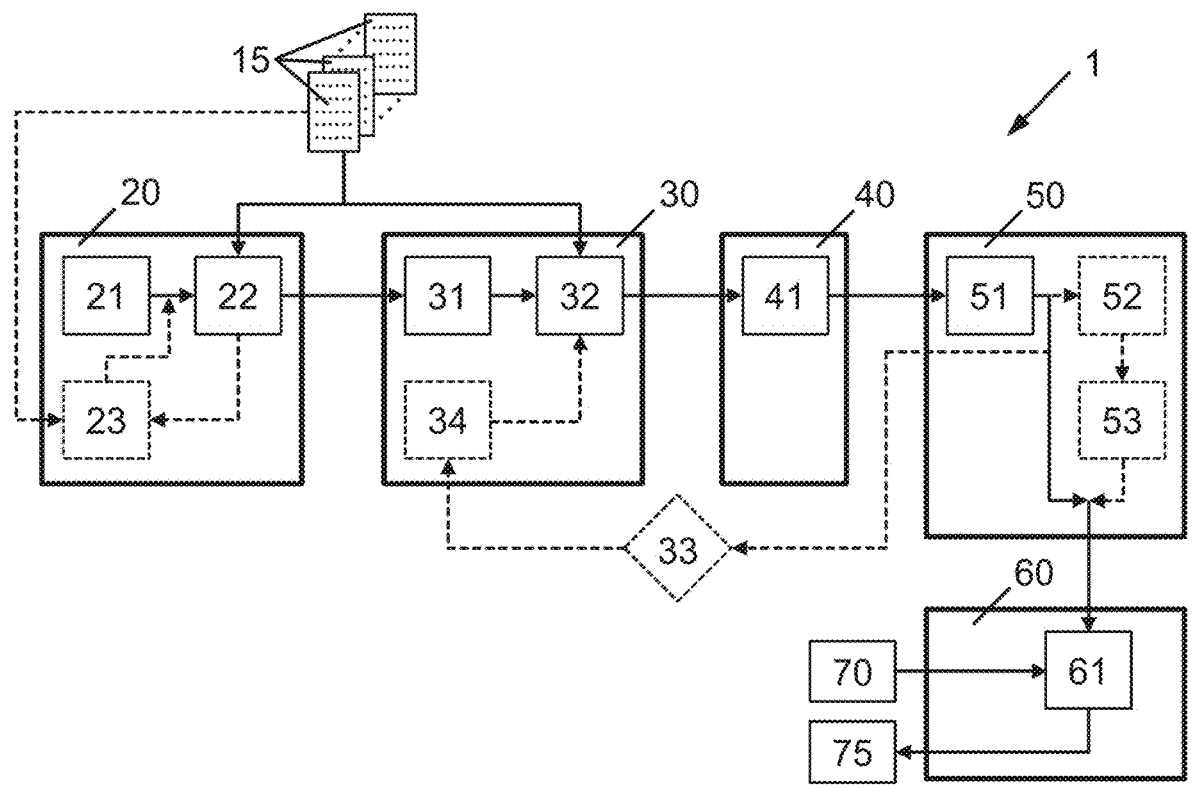
FIG. 3 diagrammatically shows a processing system in accordance with embodiments, and it also diagrammatically shows operations conducted by different modules and the relationships between the same, thereby illustrating methods in accordance with embodiments.

FIG. 3 diagrammatically shows a processing system 1 in accordance with embodiments, and it also diagrammatically shows operations conducted by different modules and the relationships between the same thereby illustrating methods in accordance with embodiments. For the sake of clarity only, dashed lines and outlines represent tasks taking place in some embodiments.

The processing system 1 comprises first, second, third, fourth and fifth modules 20, 30, 40, 50, 60 that, as aforementioned, can be part of or have tasks run by one or more processors. Blocks within the modules illustrate, for the sake of clarity only, different tasks run by each module.

The first module 20, which can be part of a classical and/or a quantum processor, sets 21 a plurality of classifiers that classify datapoints of datasets in two or more classes. The plurality of classifiers is trained 22 upon being inputted a training dataset 15 with a plurality of datapoints, and each datapoint including a respective vector with features. How the plurality of classifiers has been trained can subsequently be validated by way of a benchmarking 23 whereby datapoints of a benchmarking dataset 15 are classified in the two or more classes by the trained classifiers; depending on the outcome of the benchmarking 23, it may be determined that the classifiers should be trained 22 again.

The second module 30, which can be part of a classical processor, defines 31 a cost function, which in the present disclosure is also referred to as hierarchical cost function, and sets 32 initial weighting factors, $\lambda_n$, for different terms of the cost function. As explained above, the cost function may take the following form:

$$C = \lambda_1 \sum_j \Delta_1(A, B) + \lambda_2 \sum_j \sum_{j'} \Delta_2(C, D) + \ldots$$

where " . . . " denotes the possibility, but not necessity, of including further terms.

Below is shown a non-exhaustive list of exemplary cost functions:

$$C = \lambda_1 \sum_j \left(y_j - F(\vec{x}_j)\right)^2 + \lambda_2 \sum_j \sum_{j'} \exp\left(-y_j y_{j'} F(\vec{x}_j) F(\vec{x}_{j'})\right)$$

$$C = \lambda_1 \sum_j \left(y_j - F(\vec{x}_j)\right)^2 + \lambda_2 \sum_j \sum_{j'} \left(y_j y_{j'} - F(\vec{x}_j) F(\vec{x}_{j'})\right)^2$$

$$C = \lambda_1 \sum_j \exp\left(-y_j F(\vec{x}_j)\right) + \lambda_2 \sum_j \sum_{j'} \exp\left(-y_j y_{j'} F(\vec{x}_j) F(\vec{x}_{j'})\right)$$

It is noted that $F(\vec{x}_j) \equiv \Sigma_i \alpha_i f_i(\vec{x}_j)$ and $F(\vec{x}_{j'}) \equiv \Sigma_i \alpha_i f_i(\vec{x}_{j'})$, where $\vec{x}_j$ and $\vec{x}_{j'}$ are j-th and j-prime-th datapoints of a dataset inputted to the cost function, $y_j$ and $y_{j'}$ are the actual classes of j-th and j-prime-th datapoints, $f_i(\vec{x}_j)$ and $f_i(\vec{x}_{j'})$ are the classes of j-th and j-prime-th datapoints by the i-th classifier of the plurality of classifiers, and $\alpha_i$ is a weighting factor associated with the i-th classifier, and preferably ranges between 0 and 1. Accordingly, the first term quantifies the classification error made by each of the plurality of classifiers when classifying the entire dataset, and the second term quantifies the two-point correlation classification error made by each of the plurality of classifiers when classifying the entire dataset. The indices j and j' go over the whole length of the dataset, so in the second term they provide the two-point correlation. If additional terms are present in the cost function, the classification errors in further point correlations are quantified as well.

The second module 30 preferably sets 32 the weighting factors such that $\lambda_2 >> \lambda_1$, with each weighting factor being a real number greater than or equal to zero. The weighting factor of the first term, $\lambda_1$, may be, for example, one. A dataset 15 is also inputted in the second module 30 for setting 32 the cost function; the dataset 15 can be the training dataset of the first module 20, part thereof (i.e. include datapoints thereof), and/or a different one.

The third module 40, which can be part of a classical and/or a quantum processor, optimizes 41 the cost function defined 31 and with the weighting factors set 32 by the second module 30. In order to do so, the third module 40 converts the cost function into an Unconstrained Optimization problem, and solves it with a Tensor Network.

The fourth module 50, which can be part of a classical processor, sets 51 a boosted classifier using the output of the third module 40, namely the cost function with the optimized weighting factors $\alpha_i$; optionally, the fourth module 50 also computes probabilities for each of the two or more classes.

After setting 51 the boosted classifier, in some embodiments the fourth module 50 is provides the classifier to the fifth module 60 so that problems 70 may be solved.

In some other embodiments, the fourth module 50 goes on to store 52 the boosted classifier and the probabilities (if computed) such that they are stored with data indicative of the weighting factors of the terms of the cost function. And the fourth module 50 also commands the second module 30 to provide a modified cost function in which the previous weighting factors of the terms of cost function are modified 34. Said commanding by the fourth module 50 is only to take place if a condition 33 is met, which is that the weighting factor of the second term, $\lambda_2$, of the stored boosted classifier and probabilities is still not zero, or at least not smaller than one. If the condition 33 is met, the second module 30 modifies 34 at least the weighting factor of the second term, $\lambda_2$, without ever reaching a value below zero.

The modified 34 value is set 32 in the cost function, and the modified cost function is supplied to the third module 40 for optimization 41 thereof. The optimized 41 cost function again sets 51, by the fourth module 50, the boosted classifier and probabilities of the classes are computed as well. The pair of classifier and probabilities is again stored 52 associated with the values of the weighting factors of the terms.

This process can be repeated a number of times depending on the configuration of the system 1. A configuring parameter is, for example, how much the weighting factor of the second term is modified 34 each time by the second module 30; several possibilities exist, which may be selected based on different tests or based on the characteristics of the problem to be solved, if known. Another configuring parameter is, for example, the condition 33, which can be set to a larger value, e.g. the weighting factor of the second term cannot be below two.

Each time the process is repeated it yields a new boosted classifier (and probabilities if computed), to be stored. Once the loop ends, the fourth module 50 assesses all the stored boosted classifiers (or pairs of boosted classifiers and probabilities) so as to select 53 one of them based on its result in an accuracy test as known in the art. The selected 53 classifier or pair is provided to the fifth module 60 for solving inputted problems 70.

The fifth module 60, which can be part of a classical processor, receives the boosted classifier (and, optionally, the probabilities) from the fourth module 50 and uses it solve 61 a problem 70 inputted thereto. The solving of the problem 70 provides a solution 75 that may include: a determination of the potential existence of an anomaly in the operation of the apparatus or the system, or in the behavior of the process (that is represented by the problem 70); and/or a configuration of the apparatus or the system (represented by the problem 70) intended to improve the operation and/or solve the potential anomaly thereof, or a configuration of any apparatus or system in the process (represented by the problem 70) intended to improve the behavior and/or solve the potential anomaly thereof.

The problem 70 may be provided by a controlling device, an operator through user input means (e.g. keyboard, touchscreen, buttons, voice, mouse, etc.), a remote computing device, etc.

Figure 4:
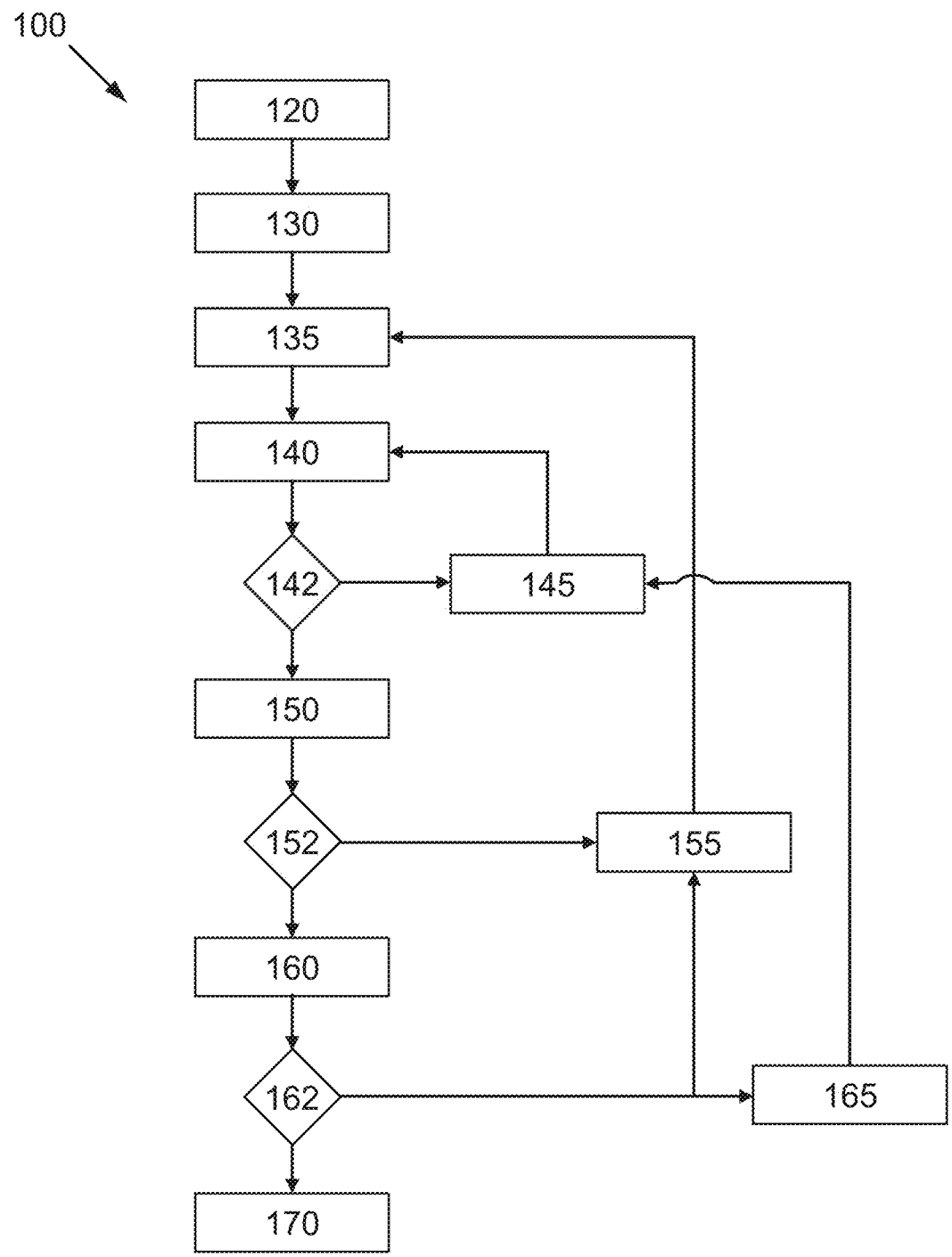
FIG. 4 diagrammatically shows part of a method in accordance with embodiments.

FIG. 4 diagrammatically shows part 100 of a method in accordance with embodiments, particularly a part for optimizing weighting factors that is carried out by a module, such as the third module 40 of the embodiments of FIG. 3. This part, for example, may be conducted in the optimization 41 of the embodiments of FIG. 3.

The optimization 100 of weighting factors comprises a step of converting 120 a cost function (e.g. the cost function defined 31 by a second module 30 as described with reference to FIG. 3), with a plurality of discrete variables, into a UO problem. When the variables of the cost function are not discrete, they are first discretized.

The optimization 100 comprises a step of providing 130 a TN with tensors. The TN is configured in such a way that it covers all possible configurations of variables of the UO problem provided in the converting step 120.

The optimization 100 comprises a step of providing 135 a set of parameters with at least one parameter being for modifying the TN (e.g. a bond dimension of the TN, a unit cell of the TN, etc.), and/or with at least one parameter for influencing the subsequent step of modifying 140 coefficients (e.g. a Trotter-step in imaginary-time evolution, an error tolerance in algebra functions used for modifying the coefficients, a number of times that each tensor must have its coefficients modified, etc.). A user or a processing device provides 135 the set of parameters.

The optimization 100 comprises a step of modifying 140, one or more times, coefficients of each tensor of the TN provided 130 for the set of parameters provided 135. The coefficients of the tensors are modified 140 such that the cost function of the UO problem decreases each time in order to achieve optimization.

The optimization 100 comprises a step of repeating 145 the modifying step 140 until first one or more predetermined criteria are met, thereby producing a loop. To this end, the one or more processing devices running the optimization 100 compare 142 the value of the cost function (or a parameter thereof) and/or a number of times that the coefficients' modifications 140 has been conducted with predetermined threshold(s) or range(s) so as to determine whether the modification 140 of coefficients of the tensors has resulted in a sufficient optimization. Regarding the former, the convergence can be established, for example, by computing a difference between the current value (or a parameter thereof) of the cost function and the value (or a parameter thereof) of the cost function before the most recent modification of coefficients of a tensor and comparing said difference with a predetermined threshold, or by computing a difference between the value (or the parameter thereof) of the cost function and the value (or the parameter thereof) of the cost function before having effected the N (with N equal to e.g. 50, 100, 500, etc.; with N equal to 1 the former example is provided) most recent modification of coefficients of tensors and comparing said difference with a predetermined threshold; when the difference does not exceed the predetermined threshold it is deemed that the value (or the parameter thereof) has converged sufficiently.

When the first one or more predetermined criteria are met, the repetition 145 of the modification 140 of coefficients is halted for the provided 135 set of parameters, and the value of the cost function is stored 150.

The one or more processing devices then check 152 whether at least two loops of providing 135 a set of parameters and modifying 140 the coefficients of the tensors have taken place, if not, it proceeds to another step of the method 100 whereby the one or more processing devices repeats 155 said two steps 135, 140 but with a different set of parameters for further optimization. When the coefficients of the tensors have been modified 140 as explained above but for the newly provided 135 set of parameters and the first one or more predetermined criteria have been met in the corresponding comparison 142, the new value of the cost function is stored 150.

The optimization 100 comprises a step of, having at least two stored 150 values, checking 160 whether the value that has been last stored (i.e. that of the last loop run) meets a second predetermined criterion relating to a convergence reached in the value of the cost function. For that, the last stored 150 value is compared with the immediately previously stored 150 value or another previously stored 150 value to determine the convergence reached in the solution after having conducted two or more loops as described above. The convergence can be established by computing a difference between a given pair of stored 150 values including the last one stored, and comparing said difference with a threshold to determine if the reduction that has been attained in the last loop or loops is small.

When the second predetermined criterion has not been met 162 in the checking step 160, the optimization 100 proceeds to the repeating 155 step (in which case a new set of parameters is provided 135) and/or to a step whereby the one or more processing devices change 165 the first one or more predetermined criteria, and then proceed to the repeating 145 for the same set of parameters provided 135 in the last loop that took place.

When the second predetermined criterion has been met 162, the optimization 100 proceeds to a step of solving 170 the UO problem using the TN and provides respective values of the plurality of discrete variables of the cost equation.

At this point, the values that achieve a reduction in the value of the cost function of the UO problem are known. These values may be outputted to a different module for the setting of a boosted classifier.

Figure 5:
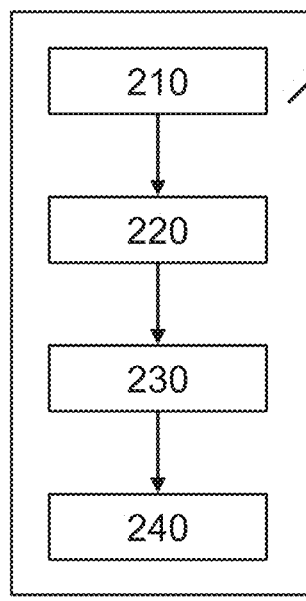
FIGS. 5-7 diagrammatically show operation of sub-modules of an optimization module in accordance with embodiments.

FIG. 5 diagrammatically shows operation of a first sub-module 200 of a module such as the third module 40 described with reference to FIG. 3.

The first sub-module 200 provides 210 the cost function to be optimized together with the variables thereof. The provision 210 of the cost function includes converting any continuous variables into discrete variables.

The first sub-module 200 provides 220 the UO problem based on the cost function provided 210. Depending on the type of cost function, the UO problem provided 220 is a UBO problem—e.g. a Quadratic UBO, a Higher-order UBO—or a UGO problem.

The first sub-module 200 then goes on to solving 230 the UO problem. For solving the problem, the first sub-module 200 preferably at least partially relies on a second sub-module 300 intended to solve the problem. The first sub-module 200 communicates the UO problem to the second sub-module 300, and once the output is provided by the latter, the first sub-module 200 processes it. In some cases, the second sub-module 300 is also part of the same processing device thus no communication between different processing devices is necessary.

With the processed output, the first sub-module 200 provides 240 a solution to the UO problem by communicating the values of the variables of the cost function.

Figure 6:
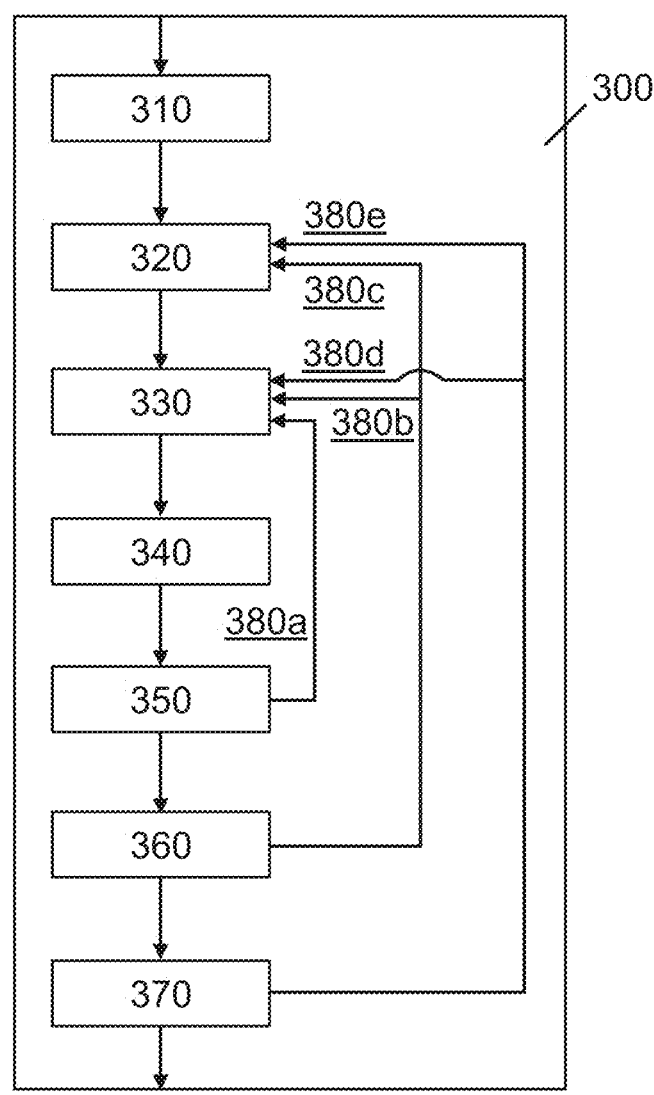

FIG. 6 diagrammatically shows operation of a second sub-module 300 of a module such as the third module 40 described with reference to FIG. 3.

The second sub-module 300 receives a UO problem from the first sub-module 200 and sets up 310 a TN in accordance with the received UO problem. The resulting TN features a structure and an optimization strategy based on the UO problem or based on user input.

Once the TN is set up 310, the second sub-module 300 provides 320 a set of parameters that modify the TN and/or influence the subsequent modification of coefficients. Then, the second sub-module 300 selects 330 a tensor, e.g. tensor i=1, so as to modify 340 the coefficients of the tensor. For the modification 340 of coefficients, the second sub-module 300 preferably at least partially relies on a third sub-module 400 intended to use linear algebra functions on the tensors to modify the coefficients according to the optimization strategy and with the aim of reducing the value of the UO problem. The third sub-module 400 sends the tensor with modified coefficients to the second sub-module 300.

After the modification 340, the second sub-module 300 checks 350 if all the tensors of the TN have had their coefficients modified so as to meet predetermined sweep criteria. If the predetermined sweep criteria are not met, the second sub-module 300 goes back 380a to select 330 a tensor among all tensors, e.g. tensor i=2, and its coefficients are modified 340. The modification 340 of coefficients, check 350 and selection 330 of another tensor are looped 380a until the predetermined criteria are met.

The predetermined sweep criteria relate to the number of times that the tensors have been modified, thus it sets how many times the tensors must have their coefficients modified 340; the number of times does not necessarily have to be equal for all tensors, but they all have to be modified at least once.

Afterwards, the second sub-module 300 checks 360 if first one or more predetermined criteria are met, for example whether the TN meets one or more criteria, such as whether the total number of coefficients' modification 340 exceeds a predetermined value. The first one or more predetermined criteria may additionally or alternatively relate to the UO problem itself, for example whether one or more parameters related to the value of the cost function have achieved a predetermined convergence. If the first one or more predetermined criteria are not met, the second module 300 forces 380b further tensor selection(s) 330 for further coefficients' modifications 340 until the first one or more predetermined criteria are met.

When the first one or more predetermined criteria are met, the second sub-module 300 stores the value of the cost function and checks 370 whether a second predetermined criterion is met, which is whether the value of the cost function of the UO problem has attained a predetermined convergence, something that can be checked 370 when at least two loops 380c of modifying 340 the tensors have been effected with different sets of parameters provided 320 in each loop 380c, that is to say, the procedure starting from the provision 320 of a set of parameters must be repeated at least once (but can be repeated twice, thrice or even more times) and each time meeting the first one or more predetermined criteria and storing the value of the cost function. If not, then the second sub-module 300 forces 380d additional looping of the tensor selection 330, modification 340 and checks 350, 360 but changing the first one or more predetermined criteria, and/or it forces 380e additional looping of the provision 320 of a set of parameters, tensor selection 330, modification 340 and checks 350, 360.

When the cost function meets the second predetermined criterion, a solution can be outputted, which will be received by the first sub-module 200.

Figure 7:
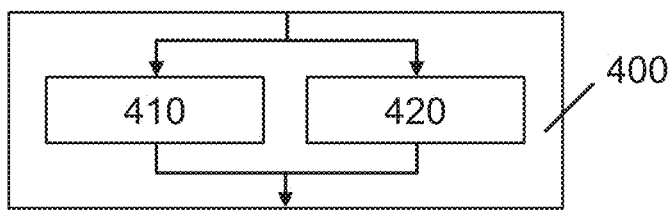

FIG. 7 diagrammatically shows operation of a third sub-module 400 of a module such as the third module 40 described with reference to FIG. 3.

The third sub-module 400 receives the TN and the cost function of the UO problem from the second sub-module 300.

The third sub-module 400 includes at least one quantum processor 410, or at least one classical processor 420, or both processors 410, 420.

The received data is provided to each processor 410, 420 of the third sub-module 400, which in turn modifies the coefficients of the selected tensor to reduce the cost function. When more than one processor 410, 420 is provided within the third sub-module 400, or when multiple third sub-modules 400 or processing devices are to modify coefficients of the tensors, said modification is preferably performed with distributed processing, and more preferably with high-performance computing, thereby reducing the time the second sub-module 300 has to wait for the updated tensor. The output of the third sub-module 400 is provided to the second sub-module 300. When multiple processors 410, 420 are arranged, irrespective of the nature thereof (i.e. quantum or classical), the third sub-module 400 preferably processes the solutions provided by each processor 410 in order to produce the tensor with modified coefficients, which in turn is provided to the second sub-module 300. Notwithstanding, the second sub-module 300 may likewise perform such task in some embodiments.

The at least one quantum processor 410 runs quantum linear algebra functions such as one or more of: quantum SVD, quantum ED, quantum PCA, quantum MM, etc. The at least one classical processor 420 runs classical linear algebra functions such as one or more of: SVD, ED, PCA, MM, etc.

It is noted that when quantum processors 410 are present in the third sub-module 400 and the quantum processors 410 are not based on electrical signals, one or more converters are provided, either within the third sub-module 400, the second sub-module 300 or between the second and third sub-modules 300, 400. The converter(s) transform electrical signals into the physical medium used by the at least one quantum processor 410 and vice versa. By way of example, in some embodiments one or more quantum processors 410 are photonics quantum processors or devices adapted to conduct Gaussian Boson Sampling; in such embodiments, the electrical signals are converted into light, the light is inputted to the quantum processor(s) 410, and the resulting light output is converted into electrical signals.

In this text, the term "comprises" and its derivations—such as "comprising", etc.—should not be understood in an excluding sense, that is, these terms should not be interpreted as excluding the possibility that what is described and defined may include further elements, steps, etc.

On the other hand, the disclosure is obviously not limited to the specific embodiment(s) described herein, but also encompasses any variations that may be considered by any person skilled in the art—for example, as regards the choice of materials, dimensions, components, configuration, etc.—, within the general scope of the disclosure as defined in the claims.

The invention claimed is:

1. A method comprising:
    setting, by one or more processing devices, a plurality of classifiers for classification of data in two or more classes, and each of the two or more classes having a numeric value associated therewith;
    training, by one or more processing devices, the plurality of classifiers by inputting a first dataset thereto and reducing a first cost function associated with the plurality of classifiers, wherein all of the plurality of classifiers classify each datapoint of the first dataset in one of the two or more classes;
    defining, by one or more processing devices, a second cost function, the second cost function at least comprising a first term including an error function with an error of A relative to B and a second term including an error function with an error of C relative to D, and each term being weighted by a respective weighting factor greater than zero, where:
        A is $F(\vec{x}_j) = \Sigma_i \alpha_i f_i(\vec{x}_j)$, where $\vec{x}_j$ is a j-th datapoint of the first dataset or a subset thereof, $f_i(\vec{x}_j)$ is a classification of the j-th datapoint by an i-th classifier of the plurality of classifiers, and $\alpha_i$ is a weighting factor associated with the respective classifier;
        B is an actual class of the j-th datapoint;
        C is a two-point correlation between A and $F(\vec{x}_{j'})$, where $\vec{x}_{j'}$ is a j-prime-th datapoint of the first data set or the subset thereof;
        D is a two-point correlation between actual classes of the j-th and j-prime-th datapoints; and
        the error function of each term of the second cost function being for all datapoints of the first dataset or the subset thereof;
    optimizing, by one or more processing devices, the weighting factors associated with each classifier of the plurality of classifiers by converting the second cost function into an Unconstrained Optimization (UO) problem, and solving the UO problem with a Tensor Network (TN); and
    setting, by one or more processing devices, a boosted classifier based on the optimized weighting factors.

2. The method of claim 1, further comprising:
    solving, by the one or more processing devices setting the boosted classifier, a problem requiring classification of datapoints in a dataset in the two or more classes using the boosted classifier, the problem defining either a configuration or operation of an apparatus or system, or behavior of a process; and
    determining, by one or more processing devices, at least one of the following based on a solution to the problem:
        whether a potential anomaly exists in the operation of the apparatus or the system, or in the behavior of the process; and
        a configuration of the apparatus or the system intended to at least one of improve the operation and solve the potential anomaly thereof, or a configuration of any apparatus or system in the process intended to at least one of improve the behavior and solve the potential anomaly thereof.

3. The method of claim 1, wherein the boosted classifier is defined by the following formula $F(\vec{x}_j) = \text{sign } F(\vec{x}_j)$.

4. The method of claim 1, wherein the step of setting the boosted classifier further comprises computing probabilities for each of the two or more classes.

5. The method of claim 4, further comprising:
    storing, by the one or more processing devices setting the boosted classifier, the boosted classifier and probabilities both associated with the weighting factors of the terms of the second cost function;
    modifying, by the one or more processing devices defining the second cost function, the second cost function by at least reducing the weighting factor of the second term without becoming less than zero;
    optimizing, by the one or more processing devices optimizing the weighting factors, the weighting factors associated with each classifier of the plurality of classifiers by optimizing the modified second cost function;
    setting, by the one or more processing devices setting the boosted classifier, the boosted classifier and the probabilities for each of the two or more classes based on the optimized weighting factors of the modified second cost function;
    storing, by the one or more processing devices setting the boosted classifier, the boosted classifier and the probabilities both associated with the weighting factors of the terms of the modified second cost function;
    repeating the steps of modifying the second cost function, optimizing the weighting factors by optimizing the modified second cost function, and both setting and storing the boosted classifier and the probabilities based on the optimized weighting factors of the modified second cost function at least once; and
    selecting, by the one or more processing devices setting the boosted classifier, a pair of boosted classifier and probabilities among all the stored pairs of boosted classifiers and probabilities that attains a best result in an accuracy test.

6. The method of claim 5, wherein the step of optimizing the weighting factors by optimizing the modified second cost function starts with weighting factors as optimized in a previous repetition of optimizing the weighting factors.

7. The method of claim 5, wherein the step of repeating is carried out such that at the last repetition the weighting factor of the second term of the second cost function is less than one and is preferably zero.

8. The method of claim 1, wherein in the step of defining the second cost function, the weighting factor of the second term is at least ten times greater than the weighting factor of the first term.

9. The method of claim 1, wherein the step of optimizing the weighting factors comprises:
    converting the second cost function into the Unconstrained Optimization (UO) problem;
    providing the Tensor Network (TN) with tensors such that the TN covers all possible configurations of variables of the UO problem, the variables being discretized weighting factors associated with the respective classifiers;
    providing a set of parameters and modifying coefficients of each tensor of the TN at least once for the provided set of parameters and such that, when modifying the coefficients of any tensor, a value of the cost function of the UO problem is reduced, the set of parameters relating to at least one of at least one parameter modifying the TN and at least one parameter that influences the modification of coefficients;

repeating the modifying step for the provided set of parameters until first one or more predetermined criteria are met, the first one or more predetermined criteria relating to at least one of the value of the cost function of the UO problem and a number of times that the modifying step has been conducted for the provided set of parameters;

storing at least the value of the cost function associated with the provided set of parameters every time the first one or more predetermined criteria are met;

repeating the providing the set of parameters and modifying steps one or more times, each time providing a different set of parameters so as to allow further reduction in the value of the cost function;

when the coefficients of the tensors have been modified for at least two provided sets of parameters and every time the first one or more predetermined criteria are met, checking whether the value of the cost function last stored meets a second predetermined criterion, the second predetermined criterion relating to a convergence reached in the value of the cost function based on one or more other values of the cost function stored;

every time the second predetermined has not been met in the checking step, at least one of:
repeating the providing the set of parameters and modifying steps with a different set of parameters thereby allowing further reduction in the value of the cost function, the different set of parameters relating to at least one of at least one parameter modifying the TN and at least one parameter that influences the modification of coefficients; and
changing the first one or more predetermined criteria and repeating the modifying step for the provided set of parameters; and when the second predetermined criterion has been met in the checking step, solving the UO problem using the TN and providing respective values of the weighting factors.

10. The method of claim 1, wherein:

the first term is $\Sigma_j(y_j-F(\vec{x}_j))^2$ or $\Sigma_j \exp(-y_j F(\vec{x}_j))$; and the second term is $\Sigma_{j,j'}(y_j y_{j'}-F(\vec{x}_j)F(\vec{x}_{j'}))^2$ or $\Sigma_{j,j'} \exp(-y_j y_{j'} F(\vec{x}_j)F(\vec{x}_{j'}))$;

where $y_j$ and $y_{j'}$ are numeric values of the actual classes of the j-th and j-prime-th datapoints, respectively.

11. The method of claim 1, wherein the second cost function further comprises a third term including an error function with an error of E relative to F, where:

E is a three-point correlation between A, $F(\vec{x}_{j'})$ and $F(\vec{x}_{j''})$; and F is a three-point correlation between the actual classes of the j-th, j-prime-th, and j-second-prime-th datapoints.

12. The method of claim 2, further comprising, based on a determination made in the determining, providing, by one or more processing devices, at least one command to or actuating the apparatus, the system, or the apparatus or the system intervening in the process for configuration thereof, the at least one command or actuation being intended to at least one of improve a respective operation or behavior, and solve a respective potential anomaly.

13. The method of claim 2, wherein at least one of one or more datapoints and one or more values thereof in the dataset of the problem to be solved using the boosted classifier relate to one or more devices of the apparatus, the system, or the apparatus or the system intervening in the process, and the at least one command is provided to or the actuation is made on one of the following: at least one device of said one or more devices, at least one device different from said one or more devices, and a combination thereof.

14. The method of claim 2, wherein the problem solved using the boosted classifier relates to a problem of one of: control of a factory, control of a production line, control of a machine, training of a machine learning algorithm, detection of fake news, and identification of fraud.

15. A device comprising:
at least one processor; and
at least one memory comprising computer program code for one or more programs;
the at least one processor, the at least one memory, and the computer program code configured to cause the device to at least carry out the steps of:
setting a plurality of classifiers for classification of data in two or more classes, and each of the two or more classes having a numeric value associated therewith;
training the plurality of classifiers by inputting a first dataset thereto and reducing a first cost function associated with the plurality of classifiers, wherein all of the plurality of classifiers classify each datapoint of the first dataset in one of the two or more classes;
defining a second cost function, the second cost function at least comprising a first term including an error function with an error of A relative to B and a second term including an error function with an error of C relative to D, and each term being weighted by a respective weighting factor greater than zero, where:

A is $F(\vec{x}_j) \equiv \Sigma_i \alpha_i f_i(\vec{x}_j)$, where $\vec{x}_j$ is a j-th datapoint of the first dataset or a subset thereof, $f_i(\vec{x}_j)$ is a classification of the j-th datapoint by an i-th classifier of the plurality of classifiers, and $\alpha_i$ is a weighting factor associated with the respective classifier;

B is an actual class of the j-th datapoint;

C is a two-point correlation between A and $F(\vec{x}_{j'})$, where $\vec{x}_{j'}$ is a j-prime-th datapoint of the first data set or the subset thereof;

D is a two-point correlation between actual classes of the j-th and j-prime-th datapoints; and the error function of each term of the second cost function being for all datapoints of the first dataset or the subset thereof;

optimizing the weighting factors associated with each classifier of the plurality of classifiers by converting the second cost function into an Unconstrained Optimization (UO) problem, and solving the UO problem with a Tensor Network (TN); and setting a boosted classifier based on the optimized weighting factors.

16. The device of claim 15, wherein the at least one processor, the at least one memory, and the computer program code are configured to further cause the device to at least carry out the steps of:

solving a problem requiring classification of datapoints in a dataset in the two or more classes using the boosted classifier, the problem defining either a configuration or operation of an apparatus or system, or behavior of a process; and determining at least one of the following based on a solution to the problem:
  whether a potential anomaly exists in the operation of the apparatus or the system, or in the behavior of the process; and
  a configuration of the apparatus or the system intended to at least one of improve the operation and solve the potential anomaly thereof, or a configuration of any apparatus or system in the process intended to at least one of improve the behavior and solve the potential anomaly thereof.

17. The device of claim 15, wherein the at least one processor, the at least one memory, and the computer program code are configured to cause the device to set the boosted classifier by further computing probabilities for each of the two or more classes.

18. The device of claim 17, wherein the at least one processor, the at least one memory, and the computer program code are configured to further cause the device to at least carry out the steps of:
  storing the boosted classifier and probabilities both associated with the weighting factors of the terms of the second cost function;
  modifying the second cost function by at least reducing the weighting factor of the second term without becoming less than zero;
  optimizing the weighting factors associated with each classifier of the plurality of classifiers by optimizing the modified second cost function;
  setting the boosted classifier and the probabilities for each of the two or more classes based on the optimized weighting factors of the modified second cost function;
  storing the boosted classifier and the probabilities both associated with the weighting factors of the terms of the modified second cost function;
  repeating the modification of the second cost function, the optimization of the weighting factors by optimizing the modified second cost function, and both the setting and storing of the boosted classifier and the probabilities based on the optimized weighting factors of the modified second cost function at least once; and
  selecting a pair of boosted classifier and probabilities among all the stored pairs of boosted classifiers and probabilities that attains a best result in an accuracy test.

19. A non-transitory computer-readable medium encoded with instructions that, when executed by at least one processor or hardware, perform or make a device to perform the steps of:
  setting a plurality of classifiers for classification of data in two or more classes, and each of the two or more classes having a numeric value associated therewith;
  training the plurality of classifiers by inputting a first dataset thereto and reducing a first cost function associated with the plurality of classifiers, wherein all of the plurality of classifiers classify each datapoint of the first dataset in one of the two or more classes;
  defining a second cost function, the second cost function at least comprising a first term including an error function with an error of A relative to B and a second term including an error function with an error of C relative to D, and each term being weighted by a respective weighting factor greater than zero, where:
    A is $F(\vec{x}_j)=\Sigma_i \alpha_i f_i(\vec{x}_j)$, where $\vec{x}_j$ is a j-th datapoint of the first dataset or a subset thereof, $f_i(\vec{x}_j)$ is a classification of the j-th datapoint by an i-th classifier of the plurality of classifiers, and $\alpha_i$ is a weighting factor associated with the respective classifier;
    B is an actual class of the j-th datapoint;
    C is a two-point correlation between A and $F(\vec{x}_{j'})$, where $\vec{x}_{j'}$ is a j-prime-th datapoint of the first data set or the subset thereof;
    D is a two-point correlation between actual classes of the j-th and j-prime-th datapoints; and
    the error function of each term of the second cost function being for all datapoints of the first dataset or the subset thereof;
  optimizing the weighting factors associated with each classifier of the plurality of classifiers by converting the second cost function into an Unconstrained Optimization (UO) problem, and solving the UO problem with a Tensor Network (TN); and
  setting a boosted classifier based on the optimized weighting factors.

20. The non-transitory computer-readable medium of claim 19, wherein the instructions further perform or make a device to further perform the steps of:
  solving a problem requiring classification of datapoints in a dataset in the two or more classes using the boosted classifier, the problem defining either a configuration or operation of an apparatus or system, or behavior of a process; and
  determining at least one of the following based on a solution to the problem:
    whether a potential anomaly exists in the operation of the apparatus or the system, or in the behavior of the process; and
    a configuration of the apparatus or the system intended to at least one of improve the operation and solve the potential anomaly thereof, or a configuration of any apparatus or system in the process intended to at least one of improve the behavior and solve the potential anomaly thereof.

* * * * *